Figure 1:
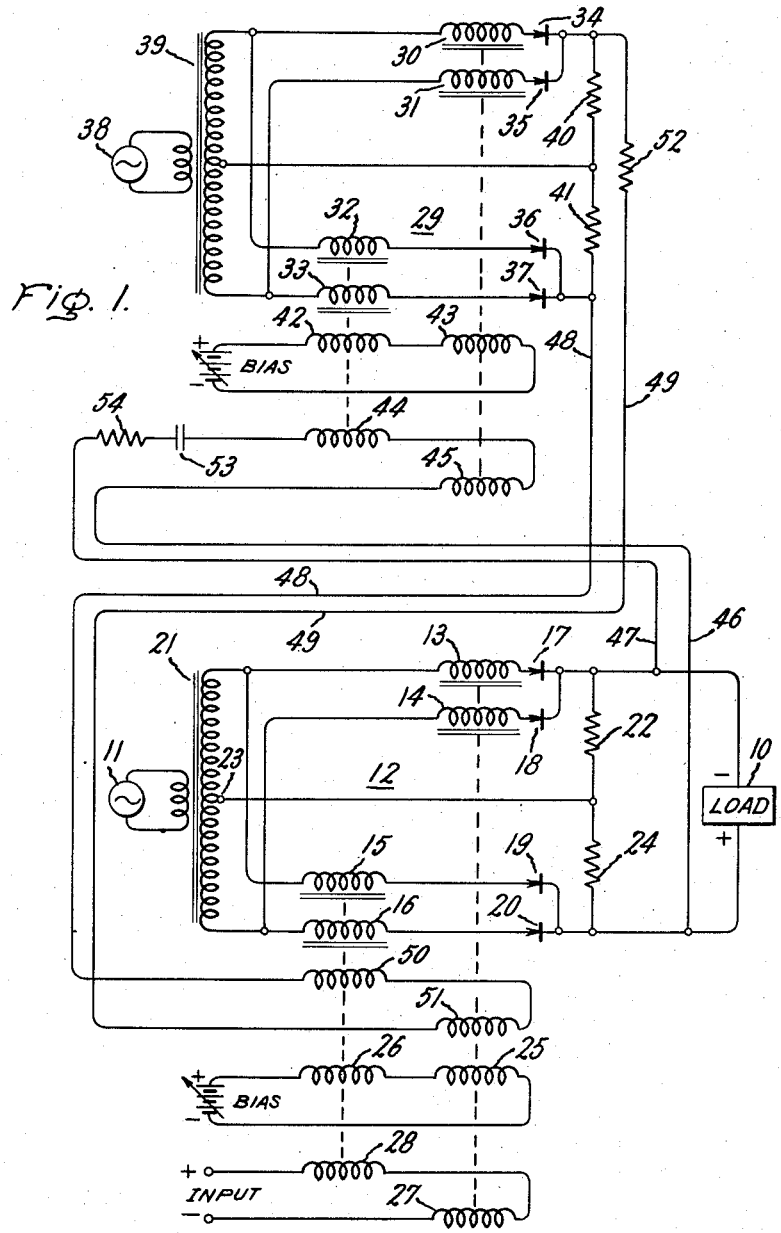

Feb. 24, 1959  J. R. LOEFFLER  2,875,393
CIRCUIT TO LIMIT COMMUTATING VOLTAGES
Filed Nov. 21, 1955  3 Sheets-Sheet 1

Inventor:
John R. Loeffler,
by Claude A. Nott
His Attorney.

Feb. 24, 1959  J. R. LOEFFLER  2,875,393
CIRCUIT TO LIMIT COMMUTATING VOLTAGES
Filed Nov. 21, 1955  3 Sheets-Sheet 2

Inventor:
John R. Loeffler,
by *[signature]*
His Attorney.

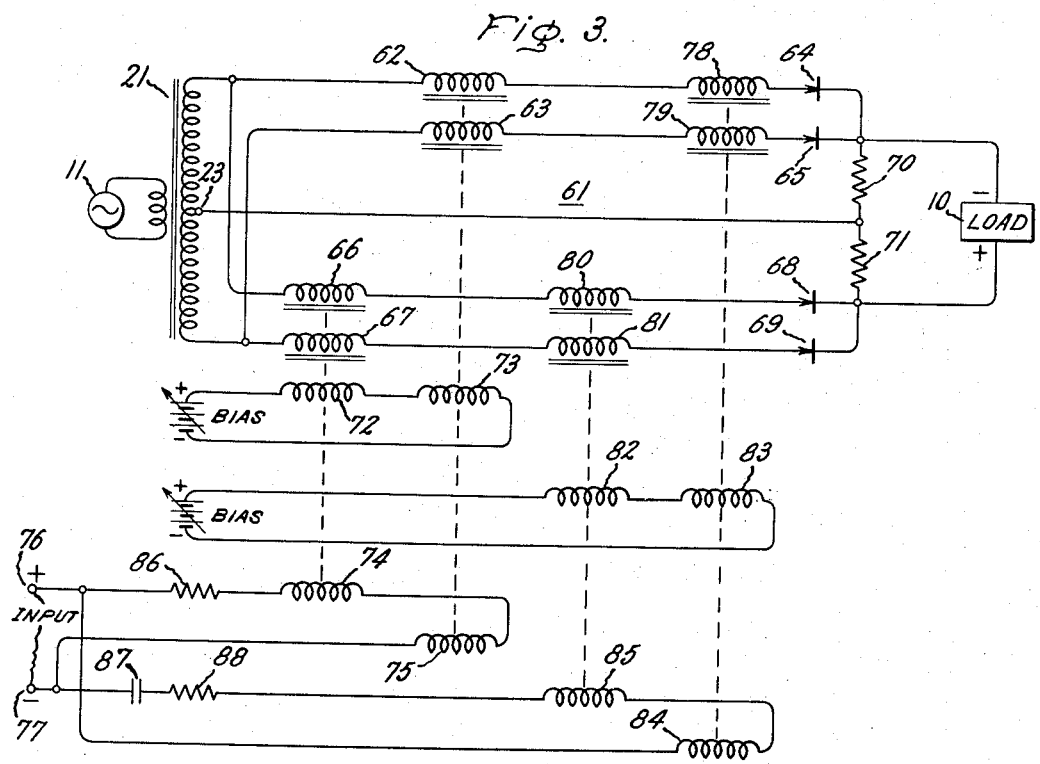
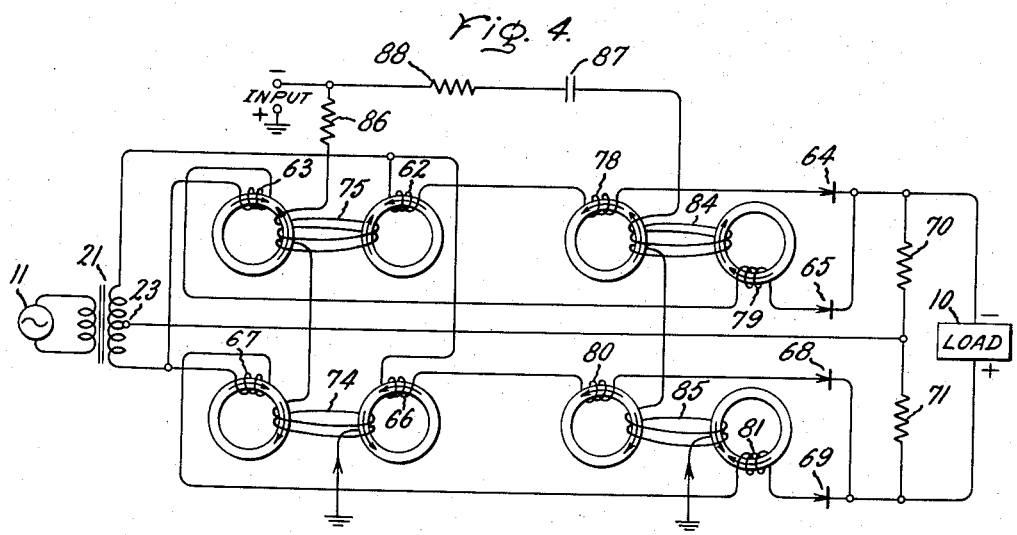

United States Patent Office 2,875,393
Patented Feb. 24, 1959

---

2,875,393

CIRCUIT TO LIMIT COMMUTATING VOLTAGES

John R. Loeffler, Schenectady, N. Y., assignor to General Electric Company, a corporation of New York Application November 21, 1955, Serial No. 548,120

16 Claims. (Cl. 318—331)

---

This invention generally relates to systems for controlling the speed and direction of rotation of D.-C. motors, and more particularly to such systems employing magnetic amplifiers.

During steady state operation, the current being directed through a motor is proportional to the difference between the voltage applied to the motor and the counter voltage, or back electromotive force, generated by the motor armature as it revolves through through the magnetic field generated by the field poles. If this applied voltage slowly increases or decreases, the motor accelerates or decelerates to follow this increase or decrease, adjusting its back electromotive force to the new conditions, and substantially balancing out the increase or decrease in the applied voltage. However, if the applied voltage to the motor transiently changes magnitude or reverses polarity faster than the inertia of the motor enables it to follow, the counter electromotive force being dependent upon the speed and direction of rotation of the motor cannot change magnitude or reverse polarity at a fast enough rate to follow this change in the applied voltage. Consequently, the resulting voltage appearing across the motor may transiently become quite large and in excess of the motor's ability to commutate at that speed, resulting in large currents being directed to the motor and causing overheating, short circuiting or flashover and arcing at the motor commutator bars.

To correct for this condition in accordance with the present invention, a motor control system is provided incorporating a means for delaying or discriminating between those applied signals that are too large and rapid at that existing speed, and those that may be safely absorbed by the motor without difficulty. This discriminating means delays the application of these undesirably large and rapid changes in signals, applying to the motor only those portions of these signals that may be absorbed; and thereafter gradually and progressively in a predetermined manner increases the portion of this signal applied to the motor as the motor accelerates or decelerates in a proper direction to assume the commanded speed. More specifically, in accordance with the present invention, a uniquely arranged magnetic amplifier circuit is employed to control the speed and direction of rotation of a motor; and this circuit is self-responsive to either its input or output exceeding predetermined limits and rates of change to correct itself and withhold any such undesirably rapid changes in applied voltage from appearing across the motor. Thus, any excessively fast change in potential that might result in overheating and commutator difficulty is withheld until the motor has gradually changed speed and can respond to the commanded changes in speed or direction; and only when the motor can absorb such changes is the full magnitude of this applied voltage placed across the motor.

It is accordingly one object of the present invention to provide a system of greater reliability for controlling the speed and direction of rotation of direct current motors.

A further object of the present invention is to provide a direct current motor control system for controlling the speed and direction of D.-C. motors in response to command signals as rapidly as the capability of the motor permits, while eliminating motor commutator difficulties.

Figure 2:
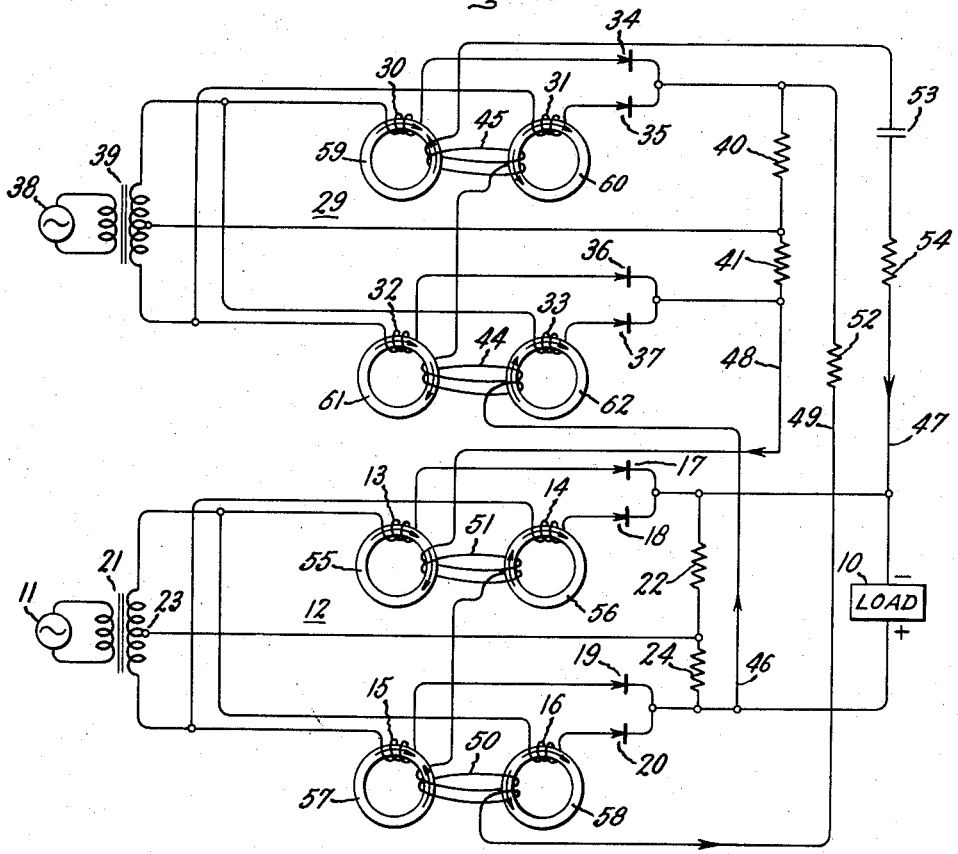

Other objects and many attendant advantages of this invention will be more readily comprehended by those skilled in the art upon a detailed consideration of the accompanying specification taken with the following drawings, wherein:

Fig. 1 is an electrical schematic drawing illustrating one embodiment of the present invention, Fig. 2 is an electrical schematic drawing similar to Fig. 1, but illustrating one preferred physical arrangement of the magnetic amplifier windings on saturable cores, Fig. 3 is an electrical schematic drawing illustrating a second embodiment of the present invention, and Fig. 4 is an electrical schematic drawing similar to Fig. 3, but illustrating one preferred physical arrangement of the magnetic amplifier windings on saturable cores.

Referring now to Fig. 1 for one preferred embodiment of the invention, there is shown a load 10, which may comprise a motor or a motor driven by a power amplifier, adapted to be variably energized by full-wave rectified potential from an alternating current source 11, through a differentially arranged self-saturable magnetic amplifier circuit generally designated 12. The amplitude of rectified direct current power being transmitted to the load 10 and the polarity of the power and voltage applied to the load 10 are dependent upon the degree of saturation of this saturable magnetic amplifier circuit; and by varying the saturation of the differentially connected reactors in this circuit, the power applied to the motor may be increased, decreased, or reversed; and the power to the load similarly controlled.

Magnetic amplifier 12 is preferably comprised of four power or load windings 13, 14, 15 and 16, each in series with a rectifier 17, 18, 19 and 20, respectively, with all of the rectifiers poled in the same direction to permit current to flow through these load windings in only one direction and thereby provide the self-saturation effect as well known in the art. Upper load windings 13 and 14 each have one terminal connected to opposite ends of a center tapped power transformer 21 whose primary winding is energized by alternating current source 11, and have their opposite terminals connected to rectifiers 17 and 18, whose opposite ends are tied together and connected to one side of a load resistor 22 whose opposite side is connected to the center tap terminal 23 of transformer 21. Lower load windings 15 and 16 are each similarly connected to opposite ends of power transformer 21 and connected in series therewith are rectifiers 19 and 20, respectively. The opposite ends of rectifiers 19 and 20 are connected in common with a second load resistor 24 whose opposite terminal is also connected to the center tap 23 of transformer 21. With this arrangement, reactor load windings 13 and 14 can variably transmit full wave rectified power to load 10 of one polarity, and reactor load windings 15 and 16 can variably transmit full wave rectified power to load 10 of the opposite polarity. Such a magnetic amplifier arrangement has been termed in the art as a push-pull full wave magnetic circuit; since the common load resistors 22 and 24, each associated with a different pair of reactor windings, are connected in back-to-back or opposite relationship whereby the difference of the voltages appearing across these resistors energizes the load 10.

Embracing reactor load windings 13 and 14 in a direction to jointly aid or oppose saturation of both these windings together is a bias winding 25, and a similar bias winding 26, in series with winding 25, embraces reactor load windings 15 and 16 in similar direction to either aid or oppose saturation of both windings together. By applying a bias potential to these series connected bias windings 25 and 26, the degree of saturation of all four load windings may be varied simultaneously and in the same direction.

Also embracing reactor load windings 13 and 14 is an input saturating winding 27 wound in a direction to oppose the saturation of these load windings when energized with the polarity of input current shown, and connected in series with this saturated winding 27 is a second saturating winding 28 embracing reactor load windings 15 and 16 and wound in a direction to aid the saturation of these windings 15 and 16. When series connected input saturating windings 27 and 28 are energized with a direct current signal of the polarity shown, the degree of saturation of reactor load windings 15 and 16 is increased, while the degree of saturation of reactor load windings 13 and 14 is decreased or reversed. Under these conditions, reactor load windings 15 and 16 are in a more fully saturated condition and conduct earlier during each half-cycle of the alternating current source than reactor load windings 13 and 14; and the potential across load resistor 24 is, therefore, greater than the potential across resistor 22. Consequently, load 10, receiving the difference of these potentials, is energized by full wave rectified power having the polarity shown; its lower terminal being energized by a more positive potential and its upper terminal by a more negative potential.

If the load in a circuit such as above described is a motor, the voltage directing current through the motor is proportional to the differential voltage output of the magnetic amplifier 12 minus the back electromotive force or counter voltage generated by the motor armature; and during steady state operation of the motor, this back E. M. F. is in opposition to and substantially balances out the amplifier output voltage, allowing only sufficient current flow through the motor to drive the motor at the desired speed. However, if the input command signal energizing saturating windings 27 and 28 should rapidly change amplitude or reverse polarity, magnetic amplifier 12 translates this rapid input command change in the applied voltage and power across the motor 10. However, the inertia of the running motor prevents the motor from instantaneously changing speed or direction in response to this rapid change in amplifier output voltage and, as a result, the counter electromotive force of the motor remains at its preceding value and polarity, while the amplifier voltage has changed value or reversed. Consequently, the voltage directing current through the motor may instantaneously rise to an excessive value or instantaneously reverse polarity; all tending to force a greater current through the commutator bars and armature winding than the motor can tolerate and hence causing commutator arcing or flashover, overheating and burning.

To prevent this from occurring, the present invention provides a means that determines when a commanded change in motor speed or commanded reversal in motor direction occurs more rapidly than the motor can tolerate; and when such a command is made, this means automatically regulates magnetic amplifier 12, preventing it from generating excess power to the motor and enabling the motor to more gradually accelerate or decelerate in a predetermined manner, until the motor can adjust to the new speed or direction.

Referring again to Fig. 1 for a detailed consideration of one such preferred regulating means, a second magnetic amplifier, generally designated 29, is provided in a feedback circuit to regulate the gain of magnetic amplifier 12 in a predetermined manner and prevent excess energization of load 10 as may occur as a result of the input signal to saturating windings 27 and 28 changing too rapidly or reversing polarity at a greater rate than is desirable.

Magnetic amplifier 29 is substantially identical to amplifier 12 and is comprised of four load windings 30, 31, 32 and 33, together with their associated rectifiers 34, 35, 36 and 37, arranged in a differential or push-pull configuration adapted to be energized by an alternating current power source 38 through a center tapped power transformer 39 and having output load resistors 40 and 41 in back-to-back relationship. An adjustable bias current passing through a biasing winding 42, embracing load windings 32 and 33, provides residual saturation for both of these windings in an aiding relation, and this current also flows in series through a biasing winding 43 which embraces both of the other pairs of load windings 30 and 31 in aiding relation. Also embracing load windings 32 and 33 is an input saturating winding 44 which is connected in series circuit relation to a second saturating winding 45 that embraces load windings 30 and 31. However, in a manner similar to the winding of amplifier 12, these two series connected saturating windings 44 and 45 are wound in a differential manner with respect to their associated load windings, whereby current through these series connected windings in one direction increases the saturation of one pair of load windings such as 32 and 33, and decreases the saturation of the other pair, such as 30 and 31, whereas current in the opposite direction through these series connected saturating windings has the reverse effect.

Upper magnetic amplifier 29 is connected in a feedback relation to amplifier 12; that is, the input saturating windings 44 and 45 of the upper magnetic amplifier 29 are connected by lines 46 and 47 across the output load resistors 22 and 24 of magnetic amplifier 12; and the voltage output appearing across the output load resistors 40 and 41 of the upper magnetic amplifier 29 is transmitted over lines 48 and 49 to two series connected input control windings 50 and 51 of magnetic amplifier 12. These additional input control windings 50 and 51 of magnetic amplifier 12 are wound in the same manner as the input signal saturating windings 27 and 28 of magnetic amplifier 12; that is, they differentially embrace the related pairs of load windings whereby current in one direction increases the saturation of load windings 15 and 16 and decreases the saturation of load windings 13 and 14, and current in the opposite direction reverses this effect.

Considering this feedback arrangement in general, it is observed that as the output of magnetic amplifier 12 directing power to load 10 varies, current is transmitted to the input windings 44 and 45 of the feedback magnetic amplifier 29 and as a result the output of this feedback magnetic amplifier 29 generates a control signal to regulate the energization of load 10. However, in accordance with the present invention and for the purpose of regulating only undesirable changes in the energization of load 10, there is provided in series with the input saturating windings 44 and 45 of the feedback magnetic amplifier 29 a capacitor 53 and a resistor 54. Capacitor 53 blocks the flow of constant direct current through saturating windings 44 and 45 and thus the feedback magnetic amplifier 29 is not energized when the voltage across load 10 is at steady state or constant value, since capacitor 53 is charged with a voltage equal and opposite to the potential across load 10 and prevents current flow through saturating windings 44 and 45. Conversely, when the potential across load 10 changes, a transient current flows through resistor 54 and capacitor 53 to the input windings 44 and 45 of magnetic amplifier 29; and this transient current has an initial amplitude proportional to the amplitude change in voltage across load 10, divided by the value of resistor 54. Thereafter, this transient current progressively decays in an exponential manner proportional to the time-constant of resistor 54 and capacitor 53 as the capacitor 53 is charged to the new value of potential appearing across load 10. If this transient input current is sufficiently large, as will be fully discussed hereinafter, magnetic amplifier 29 transmits an amplified transient output signal in feedback to the control windings 50 and 51 of magnetic amplifier 12 through a limiting resistor 52 which operates in a degenerative manner to limit the excess voltage that has tended to appear across load 10. This degenerative feedback current to the control windings 50 and 51 of magnetic amplifier 12 is thereafter progressively decreased in the same exponential manner as the feedback current passing through input windings 44 and 45 of magnetic amplifier 29 is diminished by the action of capacitor 53. Thus, the feedback amplifier 29 only responds to given changes in the voltage across load 10 and controls magnetic amplifier 12 to prevent such undesirable changes from excessively energizing the load 10. Thereafter, as load 10, which may include a motor, gradually accelerates toward the new speed or direction, the control exercised by feedback amplifier 29 progressively diminishes in an exponential decaying manner, permitting the voltage across load 10 to increase as such motor gradually and progressively changes speed or direction until reaching the desired commanded speed and direction.

The saturation of reactor cores 13, 14, 15 and 16 is initially adjusted by means of the bias current through windings 25 and 26, whereby in the absence of an input signal, all of these load windings become saturated at the same point in the alternating current source cycle, and the output of differential amplifier 12 is zero. To control the value of load voltage change that will be limited in accordance with the present invention, feedback magnetic amplifier 29, on the other hand, is preferably biased by current through bias windings 42 and 43 so that all cores are in fully saturated condition in the absence of any feedback current to input saturating windings 44 and 45; and the magnetic position of these cores on the saturation curve is so adjusted by this bias that only feedback currents of greater than a given predetermined value are sufficient to bring either pair of cores out of the fully saturated condition and enable a feedback output signal to be generated to magnetic amplifier 12. With this preferred biasing arrangement, no limitation upon the voltage across load 10 takes place until the change of potential across this load exceeds a predetermined value established by the bias current through windings 42 and 43, and only when such a predetermined voltage change across load 10 takes place does the feedback magnetic amplifier 29 exert any degenerative or limiting action upon the voltage being directed to load 10. However, when a change in voltage across load 10 directs a sufficiently large current through saturating windings 44 and 45 of feedback amplifier 29 that overcomes the saturation of this amplifier, one or the other of its pairs of differentially arranged load windings is taken out of saturation, depending upon the polarity of this feedback signal, and a current is directed backwardly to energize the control windings 50 and 51 of magnetic amplifier 12, as discussed above. This control current operates to limit the change in voltage instantaneously taking place across load 10 and prevents this voltage from changing at too rapid a rate. Thereafter, this control current is gradually diminished in an exponential manner as the capacitor 53 of feedback amplifier 29 is charged, enabling the change in voltage across load 10 to exponentially increase or decrease to the value commanded by the input signal to saturating coils 27 and 28 of magnetic amplifier 12 until the load is energized to the commanded voltage.

From the above it is apparent that when the change in potential across the load 10, that is when the algebraic difference between the existing voltage across the load 10 and the voltage across the load 10 required by the command signal, exceeds a predetermined value a transient current is caused to flow through saturating windings 44 and 45 of magnetic amplifier 29. This current is a non-linear function of such algebraic difference or change in potential, since it decays in an exponential manner, that is non-linearly, according to the time constant of resistor 54 and capacitor 53. It follows that this transient current or signal is also a non-linear function of the input or command signal to saturating windings 27 and 28 of magnetic amplifier 12, which causes the change in potential across the load 10.

Thus the present invention provides two essential functions for eliminating excess energization of the load. Initially, it discriminates between any undesirable change in load voltage and one within the desired range, and limits only such undesirable change while enabling all other changes to energize the load without limitation; and secondly, it merely temporarily restrains such undesired changes in voltage from appearing across the load until the load can respond to the new commands.

As may be observed from Fig. 2, each of the load windings may be wound about a separate saturable core member 55–62, inclusive, with the various feedback windings interconnecting the two magnetic amplifiers 12 and 29 being so wound with respect to these cores as to aid the saturation of one pair of cores in each amplifier circuit and oppose the saturation of the other pair of cores in each amplifier circuit. In this figure, only the load winding connections and the interamplifier feedback windings have been shown, whereas the bias winding connections for each amplifier and the input saturation windings 27 and 28 of amplifier 12 have been omitted for purposes of simplifying the illustration, since these connections are believed obvious and repetitious to those skilled in the art in view of the winding connections shown.

Second embodiment of the invention

In the preferred arrangement illustrated by Figs. 1 and 2 and described above, a second magnetic amplifier 29 is connected in degenerative feedback relation to a magnetic amplifier 12 driving a load 10, and it responds to the potential change across the output of the first magnetic amplifier 12 and load terminals for preventing this potential from changing amplitude or reversing polarity at a rate greater than is desirable. In accordance with a second preferred embodiment of this invention, a second magnetic amplifier is also provided as a regulating means but it is placed in cascade relation with the magnetic amplifier driving the motor rather than in feedback relation; and this second magnetic amplifier responds to certain predetermined potential changes in the input command signal rather than responding to the output signal as in the first embodiment.

Referring now to Fig. 3 illustrating this second embodiment, a load 10 is variably energized by full-wave rectified direct current impulses from an alternating current source 11 through a differentially arranged push-pull magnetic amplifier 61 in response to the amplitude and polarity of saturating current applied to its input winding terminals 76 and 77. Magnetic amplifier 61 is provided with two pairs of primary load windings 62, 63 and 66, 67, the windings of each pair being connected to opposite sides of a center tapped transformer 21 and being in series with a different one of two pairs of one-way rectifiers 64, 65 and 68, 69, respectively, each pair of rectifiers having terminals commonly tied together to an opposite terminal of two series connected load resistors 70 and 71 in back-to-back relation and whose common junction is connected backwardly to transformer center tap 23.

More specifically, reactor load windings 62 and 63 are each connected to opposite terminals of transformer secondary 21 and in series with rectifiers 64 and 65, respectively, whose opposite end terminals are commonly connected to a load resistor 70, and load windings 66 and 67 are likewise connected to transformer 21 and are in series with rectifiers 68 and 69, respectively, to a load resistor 71 placed in back-to-back relation with load resistor 70. In a similar manner to Fig. 1, both pairs of these primary load windings are also adapted to be placed in a residually semi-saturated state in unison by a different one of two series connected bias windings 72 and 73, with these bias windings commonly aiding or opposing the saturation of all load windings together, and both pairs of primary load windings are also adapted to be variably and differentially semi-saturated by a different one of two series connected input saturating windings 74 and 75, which are suitably wound to aid the saturation of one pair and oppose the saturation of the other pair, or the reverse, depending upon the polarity of applied current therethrough Placed in series with each of these four primary load windings is a different one of four secondary load windings 78-81, inclusive, with all four of these secondary load windings adapted to be placed in a state of residual saturation, in unison, by two series connected bias windings 82 and 83. Additionally embracing one pair of these secondary load windings 78 and 79 is a saturating winding 84, and in a series circuit with this saturating winding 84 is provided a second saturating winding 85 embracing the remaining pair of secondary load windings 80 and 81 with saturating windings 84 and 85 differentially wound with respect to their controlled pairs of secondary load windings so as to aid the saturation of one pair and oppose the saturation of the other.

In accordance with this second embodiment, a sufficiently large current is directed through bias windings 72 and 73 to enable each of the primary load windings 62, 63 and 66, 67, to fully saturate at the same portion of its energizing alternating current wave, and a suitably large current is directed through the bias windings 82 and 83 to place all of the secondary load windings 78, 79, 80 and 81 in a normally fully saturated condition.

In this condition of operation, the fully saturated secondary load windings 78-81, inclusive, each provides a very low impedance in its respective circuit, and the magnetic amplifier 61 normally provides an output voltage across differential resistors 70 and 71 to load 10, whose polarity and amplitude follow the polarity and amplitude of the input current passing through input saturating windings 74 and 75 and current limiting resistor 86. If, however, the command input signal changes amplitude or polarity, input current is also directed to transiently flow through a parallel path including a capacitor 87 and a resistor 88 to the secondary saturating windings 84 and 85 controlling the secondary load windings 78-81, inclusive. Since secondary saturating windings 84 and 85 are differentially wound with respect to their associated bias windings 82 and 83, current through these secondary saturating windings increases the saturation of one pair of the secondary load windings and reduces the saturation of the other pair, whereby if this transient current is sufficiently large, one or the other pair of the secondary load windings is brought out of fully saturated condition and the impedances of such pair increase. This increased impedance in the magnetic amplifier circuit is provided in the proper pair of the differentially arranged load winding circuits to reduce or compensate for the large change in voltage tending to appear across the load 10 and prevent this load voltage from increasing more rapidly than the load can absorb. Thereafter, in the same manner as the first embodiment of the invention of Figs. 1 and 2, the current through the secondary saturating windings 84 and 85 decays in an exponential manner as dictated by the time constant of capacitor 87 and resistor 88, progressively enabling the bias windings 82 or 83 to again fully saturate the secondary load windings and progressively decrease their impedances, enabling the full input saturated current to control amplifier 61 and bring the energization of the load in a similar exponential manner to its new desired value.

As may be observed from Fig. 4, each of the load windings, both primary and secondary, may be wound about a separate saturable core member with the primary and secondary saturating windings 74, 75, 84 and 85 embracing the desired pairs of cores to commonly aid or oppose the self-saturation of these cores by the load windings. The four bias winding connections (not shown) are preferably also wound to embrace the desired pairs of cores as shown schematically by Fig. 3, but rather than being differentially wound to aid saturation of one pair while opposing the other, in the manner of the saturating winding connection, they are arranged to aid or oppose both pairs in unison.

Thus the present invention provides two important functions. In the first it discriminates between changes in voltage that exceed a predetermined adjustable value and those that do not exceed this value and thereafter operates to delay or variably limit, in a predetermined manner, only the excessive changes. In other words, it provides an adjustable "dead band" determined by the degree of saturation of the second magnetic amplifier whereby voltage changes that are not large enough to bring this second magnetic amplifier out of saturation are unaffected as they pass on to energize the load. Alternatively, voltage changes that are large enough to bring the second magnetic amplifier out of saturation result in a degeneration or limiting signal being generated by the second magnetic amplifier in the first embodiment described to restrain this excessive voltage change from immediately energizing the load, while in the second embodiment the impedance of one pair of loading windings is increased to restrain this excessive voltage change from immediately energizing the load.

In the second important function, this degenerative feedback signal or increase in impedance of one pair of load windings is progressively reduced in a predetermined manner, such as exponentially with time, whereby the voltage energizing the load is allowed to progressively increase in the same manner as a function of time allowing the load to gradually adjust to the new condition and eliminating the undesirable transient condition.

Although this invention has been described in connection with a system for controlling the energization of a motor, it is well known to those skilled in the art that the problem of transient elimination exists in many other applications where this invention might be advantageously employed. Additionally it is believed obvious to those skilled in the art that many changes may be made in the magnetic amplifier circuitry illustrated and described without departing from the spirit and scope of this invention. For example, the feedback amplifier may be made to respond to acceleration rather than velocity; that is, to the rate of change of the voltage by substituting an acceleration responsive network for the capacitor-resistor rate network 53 and 54. Similarly, the feedback amplifier may be made to limit voltage output in other than an exponential manner with time by substituting other known networks for the capacitor-resistor network. Since these and other changes are believed well within the knowledge of those skilled in this art, this invention is to be considered as limited only by the claims appended hereto.

What I claim as new and desire to secure by Letters Patent of the United States is:

1. In a system for controlling the speed of a motor, a first magnetic amplifier energizable by an alternating current source and having an output for controlling the energization of said motor, a saturating winding responsive to a command signal for controlling the degree of saturation of said first amplifier, a second magnetic amplifier energizable by an alternating current source and means interconnecting said first and second magnetic amplifiers for energizing the saturating winding of said second magnetic amplifier with a signal proportional to a non-linear function of the change in degree of saturation of said first magnetic amplifier, to thereby control the degree of saturation of said second magnetic amplifier, said first and second amplifiers being so connected that the degree of saturation of said second magnetic amplifier determines the output of said first magnetic amplifier for controlling the energization of said motor.

2. In the system of claim 1, means for adjustably biasing said second magnetic amplifier to a steady state condition beyond its fully saturated condition.

3. In a system for controlling the speed of a motor, a first magnetic amplifier energized by an alternating current source and having an output for controlling the energization of said motor, a saturating winding responsive to a command signal for controlling the degree of saturation of said first amplifier, a control winding for controlling the degree of saturation of said first amplifier, a second magnetic amplifier energizable by an alternating current source and having an output degeneratively connected to energize said control winding, means for adjustably biasing said second magnetic amplifier beyond its fully saturated condition, and means interconnecting said first and second magnetic amplifiers for energizing the saturating winding of said second magnetic amplifier with a signal proportional to a non-linear function of said command signal.

4. In the system of claim 3, said first and second amplifiers each being self-saturable and having a power winding and a rectifier in series circuit connection energizable by said alternating current source.

5. In the system of claim 4, said interconnecting means including a means for continuously determining the existing energization of said motor, and means for energizing the saturating winding of said second amplifier with a signal that is a function of the algebraic difference between the existing voltage energizing said motor and the voltage required by said command signal.

6. In the system of claim 5, said interconnecting means including a network comprised of a capacitor and a resistor in series circuit with the saturating winding of said second amplifier.

7. In a system for controlling the speed of a motor, a first magnetic amplifier energized by an alternating current source and having an output for controlling the energization of said motor, a saturating winding responsive to a command signal for controlling the degree of saturation of said first amplifier, a control winding for controlling the degree of saturation of said first amplifier, a second magnetic amplifier energizable by an alternating current source and having an output degeneratively connected to energize said control winding, means for adjustably biasing said second magnetic amplifier beyond its fully saturated condition, means interconnecting said first and second magnetic amplifiers for energizing the saturating winding of said second magnetic amplifier with a signal proportional to a non-linear function of said command signal, said interconnecting means including a capacitor and a resistor in series circuit with the saturating winding of the second amplifier.

8. In a system for controlling the speed of a motor, a first magnetic amplifier energized by an alternating current source and having an output for controlling the energization of said motor, a saturating winding responsive to a command signal for controlling the degree of saturation of said first amplifier, a control winding for controlling the degree of saturation of said first amplifier, a second magnetic amplifier energizable by an alternating current source and having an output degeneratively connected to energize said control winding, means for adjustably biasing said second magnetic amplifier beyond its fully saturated condition, and means interconnecting said first and second magnetic amplifiers for energizing the saturating winding of the second magnetic amplifier with a signal from said first amplifier nonlinearly related to said command signal, said interconnecting means including a means for continuously determining the existing voltage energizing said motor and a means for energizing the saturating winding of the second amplifier with a signal that is a function of the algebraic difference between the existing voltage energizing said motor and the voltage required by said command signal.

9. In the system of claim 7, means connecting said series connected network and saturated winding across the output of the first magnetic amplifier.

10. In a system for generating a signal linearly proportional to a command signal within a given adjustable range and nonlinearly proportional to given changes in said command signal beyond said adjustable range, a first magnetic amplifier energizable by an alternating current source and having an output generating said signal, a saturating winding responsive to a command signal for controlling the degree of saturation of said first amplifier, a second magnetic amplifier energizable by an alternating current source and degeneratively connected to control the degree of saturation of said first magnetic amplifier, means for adjustably biasing said second magnetic amplifier beyond its fully saturated condition to determine said range, and means interconnecting said first and second magnetic amplifier for energizing the saturating winding of said second magnetic amplifier with a signal from said first amplifier that is nonlinearly related to said command signal.

11. In a system for generating a signal linearly proportional to a command signal within a given adjustable range and nonlinearly proportional to given changes in said command signal beyond said adjustable range, a first magnetic amplifier energizable by an alternating current source and having an output generating said signal, a saturating winding responsive to a command signal for controlling the degree of saturation of said first amplifier, a second magnetic amplifier energizable by an alternating current source and degeneratively connected to control the degree of saturation of said first magnetic amplifier, means for adjustably biasing said second magnetic amplifier beyond its fully saturated condition to establish said range, and means interconnecting said first and second magnetic amplifier for energizing the saturating winding of said second magnetic amplifier with a signal from said first amplifier proportional to the rate of change of said command signal.

12. In the system of claim 8, said interconnecting means including a capacitor and resistor in series circuit with the second saturating winding to enable energization of said saturating winding with a signal proportional to the rate of change of a signal related to said command signal.

13. In a system for eliminating given transient energization of a load resulting from a transiently varying command signal, a first magnetic amplifier responsive to said command signal for energizing the load, a second magnetic amplifier having an input saturating winding and a biasing winding, means for adjustably biasing said biasing winding beyond its fully saturated condition to a predetermined level, means including a resistor and a capacitor interconnecting said first and second magnetic amplifiers for energizing the saturating winding of said second amplifier with a signal proportional to the rate of change of said command signal, to thereby control the degree of saturation of said second magnetic amplifier, and circuit means connecting said first and second magnetic amplifiers such that the degree of saturation of said second magnetic amplifier determines the energization of said load by said first magnetic amplifier.

14. In the system of claim 13, said interconnecting means coupling the saturating winding of said second magnetic amplifier with the input of said first magnetic amplifier through said resistor and capacitor.

15. In the system of claim 13, said interconnecting means coupling the saturating winding of the second magnetic amplifier with the output of the first magnetic amplifier through said resistor and capacitor.

16. A system for controlling energization of a load comprising a first magnetic amplifier energizable by an alternating current source and having an output for controlling the energization of said load, a saturating winding responsive to a command signal for controlling the degree of saturation of said first magnetic amplifier, a second magnetic amplifier energizable by an alternating current source, a saturating winding for controlling the degree of saturation of said second magnetic amplifier, means interconnecting said first and second magnetic amplifiers for energizing the saturating winding of said second magnetic amplifier when said command signal exceeds a predetermined value, and circuit means connecting said first and second magnetic amplifiers such that the degree of saturation of said second magnetic amplifier determines the output of said first magnetic amplifier that energizes said load.

References Cited in the file of this patent

UNITED STATES PATENTS

| | | |
|---|---|---|
| 2,555,992 | Ogle | June 5, 1951 |
| 2,561,329 | Ahlen | July 25, 1951 |
| 2,721,304 | Silver et al. | Oct. 18, 1955 |